US009622057B1

(12) United States Patent
Qu et al.

(10) Patent No.: US 9,622,057 B1
(45) Date of Patent: Apr. 11, 2017

(54) DEVICE AND METHOD FOR FORWARDING VOICE CALLS RECEIVED AT THE DEVICE TO A PAIRED COMPUTING DEVICE

(71) Applicant: BLACKBERRY LIMITED, Waterloo (CA)

(72) Inventors: Kai Qu, Waterloo (CA); Jun Xu, Scarbrough (CA); Lizhong Zhu, Waterloo (CA); Libo Zhu, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/996,911

(22) Filed: Jan. 15, 2016

(51) Int. Cl.
*H04W 4/16* (2009.01)
*H04L 29/06* (2006.01)

(52) U.S. Cl.
CPC .......... *H04W 4/16* (2013.01); *H04L 65/1006* (2013.01); *H04L 65/1069* (2013.01)

(58) Field of Classification Search
CPC ... H04W 4/16; H04L 65/1006; H04L 65/1069
See application file for complete search history.

(56) References Cited

U.S. PATENT DOCUMENTS 4,723,273 A * 2/1988 Diesel .................. H04M 3/436 379/142.01
7,313,228 B1 * 12/2007 Sorice ................ H04M 7/0033 370/352
2002/0146105 A1 * 10/2002 McIntyre ............ H04M 3/436 379/211.02
2005/0032509 A1 * 2/2005 Benco .................. H04M 3/543 455/417
2012/0099719 A1 * 4/2012 Erb ..................... H04M 3/436 379/211.01

OTHER PUBLICATIONS https://support.skype.com/en/faq/FA1348/what-happens-when-someone-calls-me-while-i-m-on-a-call Accessed Nov. 13, 2015.
https://www.safaribooksonline.com/library/view/ipad-the-missing/9781491948033/ch04.html Accessed Nov. 13, 2015.

* cited by examiner

*Primary Examiner* — Kashif Siddiqui
(74) *Attorney, Agent, or Firm* — Perry + Currier, Inc.

(57) ABSTRACT

A mobile communication device and method for forwarding a new voice call, received at the device during a current voice call, to a paired computing device is provided. The method includes, at the device comprising a processor, a display device, a memory and a communication interface, receive a new voice call while a current voice call is active at the device and display, on the display device, a selectable option for forwarding the new voice call. Upon detecting selection of the selectable option: retrieve, from the memory one or more stored device identifiers, each stored device identifier associated with a paired computing device, display, on the display device, the one or more stored device identifiers and upon detecting selection of a device identifier of the one or more stored device identifiers, forward the new voice call, using the communication interface, to the paired computing device associated with the device identifier.

23 Claims, 15 Drawing Sheets

DEVICE AND METHOD FOR FORWARDING VOICE CALLS RECEIVED AT THE DEVICE TO A PAIRED COMPUTING DEVICE

FIELD

The present specification relates generally to mobile communication devices, and specifically to a mobile communication device and method for forwarding a new voice call, received at a mobile communication device during a current voice call, to a paired computing device.

BACKGROUND

Mobile communication devices have gained widespread use and may provide a variety of functions including, for example, telephonic functions, electronic text messaging functions, web browsing functions, and other personal information manager (PIM) application functions. Mobile communication devices, such as smartphones and personal digital assistants (PDA's), may receive a voice call from a service provider while hosting a separate data session from the service provider. Such mobile communication devices, however, are incapable of simultaneously hosting two separate voice calls.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
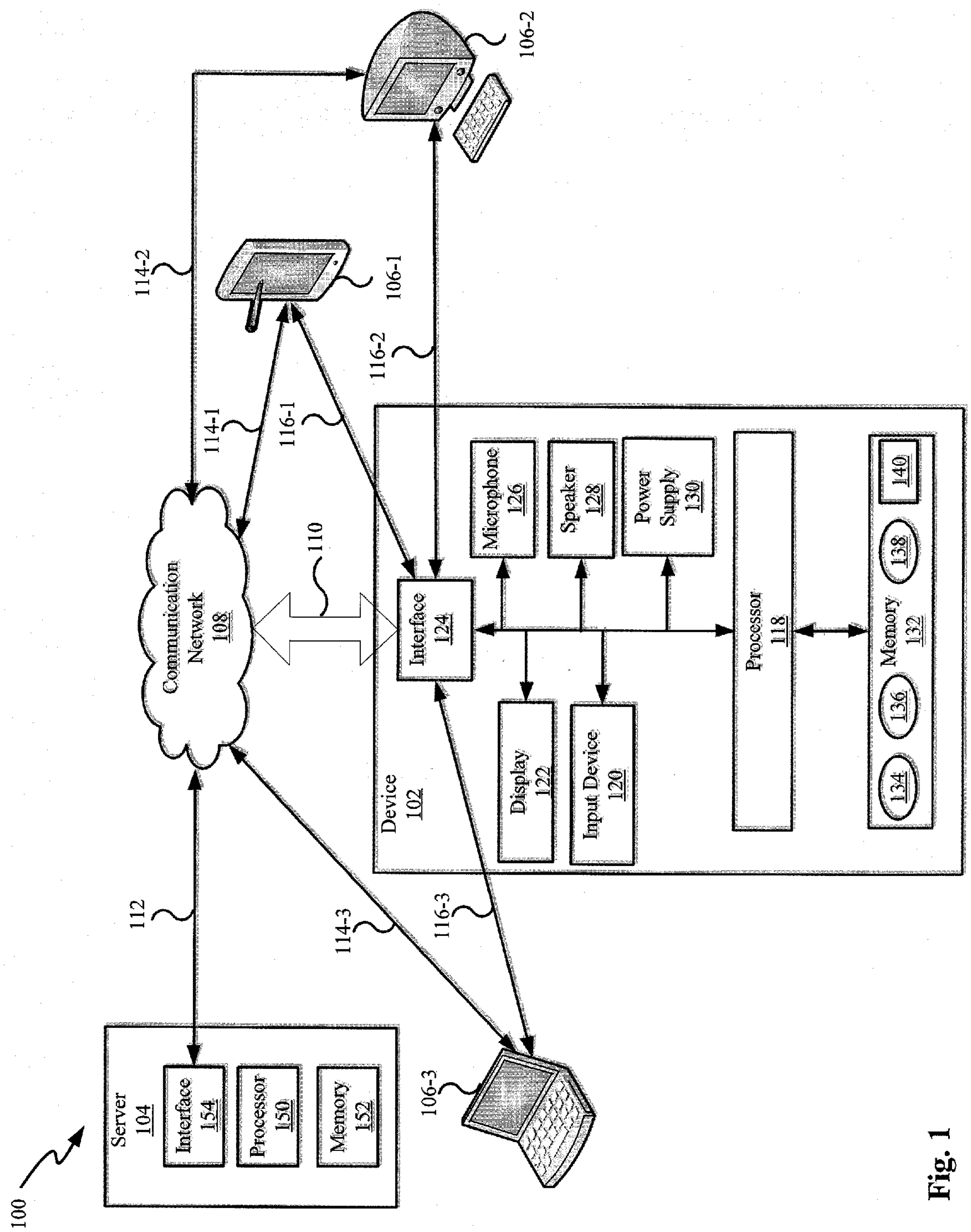
FIG. 1 is a block diagram of a communication system, in accordance with an example implementation of the present specification.

The present specification relates to a mobile communication device and method for forwarding a new voice call, received during a current voice call, to a paired computing device without terminating the current voice call. The mobile communication device is paired with the computing device when the mobile communication device is in communication with the computing device and the mobile communication device and the computing device are associated with a common (i.e. the same) platform identifier.

An aspect of the present specification provides a mobile communication device comprising: a memory storing one or more computing device identifiers, each computing device identifier associated with a paired computing device; a communication interface configured to communicate with a communication network; a display device; and, a processor operably coupled to the communication interface and the display device. The processor configured to: receive, from the communication network via the communication interface, a new voice call while a current voice call is active on the mobile communication device; display, on the display, a selectable icon for forwarding the new voice call; in response to detecting selection of the selectable icon: display, on the display device, the one or more selectable device identifiers; in response to detecting selection of a selectable device identifier of the one or more selectable device identifiers, forward the new voice call, using the communication interface, to the paired computing device associated with the device identifier.

The mobile communication device may be associated with a platform identifier, and wherein each paired computing device stored in the memory may be currently in communication with the mobile communication device and associated with the platform identifier associated with the mobile communication device.

The processor may be further configured to forward the new voice call to the paired computing device without terminating the current voice call by: establishing a communication session with the paired computing device associated with the device identifier; and transferring the new voice call to the paired computing device associated with the device identifier using the communication session.

In another aspect of the present specification, the new voice call may be cellular voice call received from a base station of the communication network and the current voice call is a data voice call received from the communication network.

The processor may be further configured to, prior to transferring the new voice call, transform the new voice call to a data voice call and transferring the new voice call may include transferring the data voice call to the paired computing device associated with the device identifier using the communication session.

The processor may be further configured to establish a communication session with the paired computing device associated with the device identifier by establishing a session initiation protocol (SIP) session.

The processor may be further configured to transfer access permissions for a speaker and a microphone of the computing device.

The communication interface may include a cellular circuit configured to communicate with the base station of the communication network, and the processor may be further configured to: in response to receipt of an answer call command from the paired computing device, answer the new voice call using the cellular circuit. In another aspect of the present specification provides, the new voice call may be data voice call and the current voice call is a cellular voice call received from a base station of the communication network.

The processor may be further configured to: absent detecting selection of the selectable icon for forwarding the new voice call, reject, at the mobile communication device, the new voice call.

The processor may be further configured to: display on the on the display device, a second selectable icon for ignoring the new voice call and; in response to detecting selection of the second selectable icon, reject, at the mobile communication device, the new voice call.

Another aspect of the present specification provides a method comprising: at a mobile device comprising a processor, a memory, a communication interface, and a display device, receiving, via the communication interface, a new voice call while a current voice call is active at the mobile communication device; displaying on the display device, a selectable icon for forwarding the new voice call; in response to detecting selection of the selectable icon; retrieving, from the memory, one or more stored device identifiers, each stored device identifier associated with a paired computing device; displaying, on the display device, the one or more stored device identifiers; in response to detecting selection of a device identifier of the one or more stored device identifiers, forwarding the new voice call, using the communication interface, to the paired computing device associated with the device identifier.

Another aspect of the present specification provides a non-transitory computer-readable medium storing computer-readable instructions, which when executed by a processor of a mobile communication device comprising display device, a memory and a communication interface causes the processor to: receive a new voice call while a current voice call is active at the mobile communication device; display, on the display device, a selectable icon for forwarding the new voice call; in response to detecting selection of the selectable icon: retrieve, from the memory one or more stored device identifiers, each stored device identifier associated with a paired computing device; display, on the display device, the one or more stored device identifiers; in response to detecting selection of a device identifier of the one or more stored device identifiers, forward the new voice call, using the communication interface, to the paired computing device associated with the device identifier.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

For simplicity and clarity of illustration, reference numerals may be repeated among the figures to indicate corresponding or analogous elements. Numerous details are set forth to provide an understanding of the implementations described herein. The implementations may be practiced without these details. In other instances, well-known methods, procedures, and components have not been described in detail to avoid obscuring the implementations described. The specification is not to be considered as limited to the scope of the implementations described herein.

Figure 2:
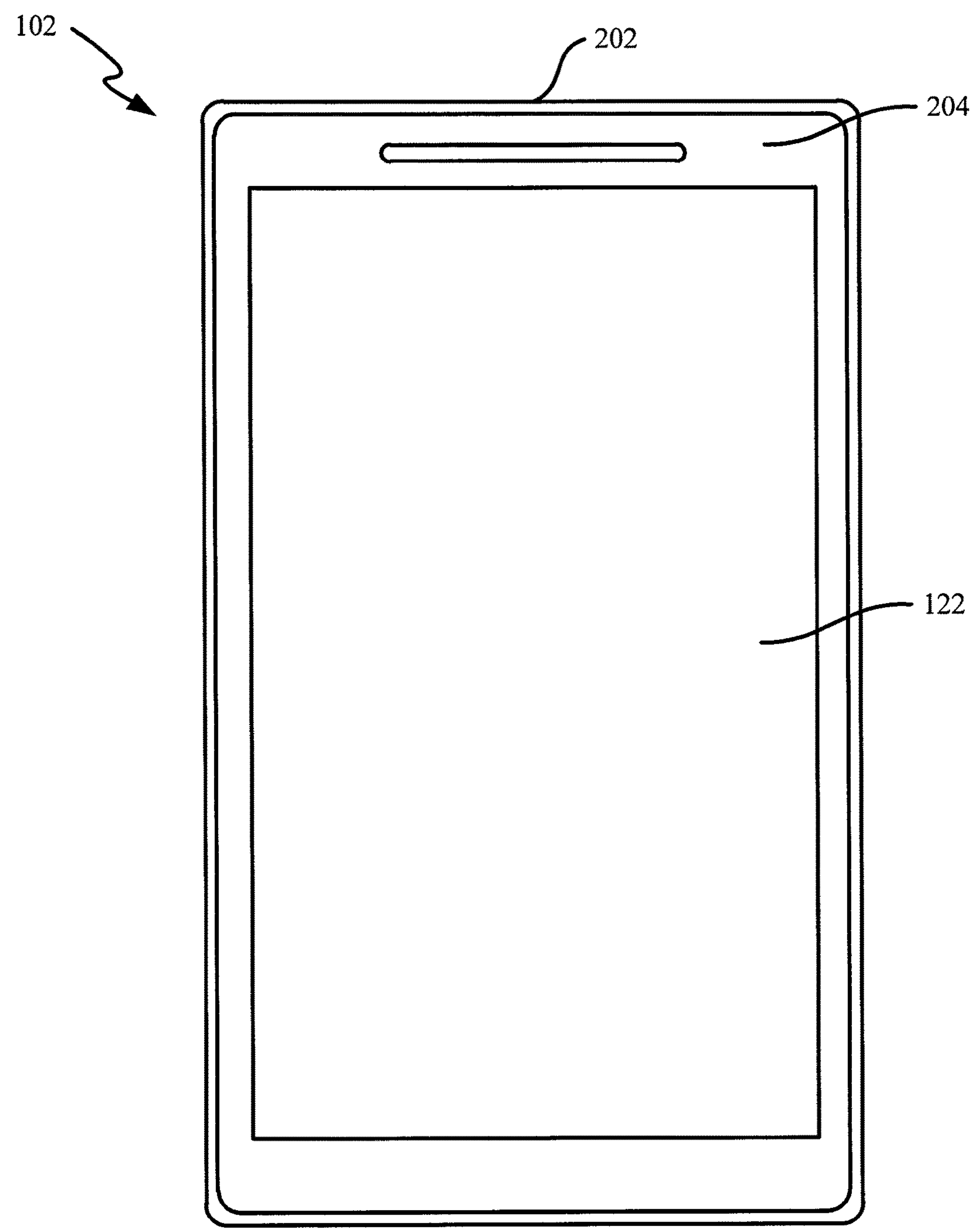
FIG. 2 is a front view of the mobile communication device in the system of FIG. 1, in accordance with an example implementation of the present specification.

FIG. 1 depicts a system 100 which includes a mobile communication device 102 (referred to hereafter as device 102), a server 104, three computing devices 106-1, 106-2, 106-3, and at least one communication network 108 (referred to hereafter as network 108). FIG. 2 depicts a front view of device 102, according to non-limiting implementations. Also depicted in FIG. 1 are schematic block diagrams of device 102 and server 104, according to non-limiting implementations, as described hereafter.

Referring to FIG. 1, device 102 and server 104 are configured to communicate with each other using network 108 and respective links 110, 112 according to non-limiting implementations. Server 104 and computing device 106-1 are configured to communicate with each other using network 108 and respective links 112 and 114-1. Similarly, server 104 and computing device 106-2 are configured to communicate with each other using network 108 and respective links 112 and 114-2 and server 104 and computing device 106-3 are configured to communicate with each other using network 108 and respective links 112 and 114-3.

Device 102 and computing device 106-1 are configured to communicate with each other using link 116-1. Similarly, device 102 and computing device 106-2 are configured to communicate with each other using link 116-2 and device 102 and computing device 106-3 are configured to communicate with each other using link 116-3. Although system 100 in the example implementation shown in FIG. 1 includes three computing devices 106-1, 106-2, 106-3, system 100 may include any suitable number of computing devices. Each computing device is configured to communicate with device 102 using any suitable link.

Device 102 includes multiple components, such as a processor 118 that controls the overall operation of device 102. Processor 118 is coupled to and interacts with other components of device 102, including at least one input device 120, a display device 122 (hereinafter referred to as display 122), a communication interface 124, a microphone 126, a speaker 128, a power supply 130, a memory 132.

Server 104 generally comprises a processor 150, a memory 152 and a communication interface 154. Memory 152 stores a software platform 156 (hereinafter referred to as platform 156) that controls the overall operation of server 104. Platform 156, when executed by processor 150, implements a set of services associated with platform 156. The set of services include, for example, a communication service, such as a messenger service, or a data voice and/or video call service, and a data delivery service. Platform 156 stores in memory 152 a unique identifier for each user of the set of services associated with platform 156 (hereinafter referred to as a platform ID) and manages the platform ID for each user of the set of services associated with platform 156. The platform ID for a user may include a username or email address associated with a particular user of the set of services. A password may also be associated with the platform ID for a user. Alternatively, the platform ID for a user may be a fingerprint of the user. An example of the platform ID for a user of the set of services associated with platform 156 is a Blackberry ID™ developed by Blackberry®. Other examples of platform ID are Google™ ID, Apple™ ID and the like.

Platform 156 also stores in memory an identifier associated with each computing devices 106-1, 106-2, 106-3 (hereinafter referred to as computing device ID) that has accessed at least one of the set of services associated with platform 156. The computing device ID associated with computing devices 106-1, 106-2, 106-3 may be any suitable identifier of the respective computing device 106-1, 106-2, 106-3, such as for example, a media access controller (MAC) address, a serial number, or a hexadecimal personal information number (PIN) associated with the respective computing devices 106-1, 106-2, 106-3. In the example implementation depicted in FIG. 1, server 104 is a single server. However, it will be appreciated that server 104 may include any suitable number of servers. Also, in the example implementation shown in FIG. 1, each respective paired computing device 106-1, 106-2, 106-3 has accessed at least one of the set of services associated with platform 156.

Each respective computing device 106-1, 106-2, 106-3 may be any type of electronic device that can be used in a self-contained manner, such as, for example a personal computer, a laptop computer, a portable electronic device, a mobile computing device, a portable computing device, a tablet computing devices, a laptop computing device, a PDA, a smartphone, and the like. Other suitable computing devices are within the scope of present implementations.

Network 108 can comprise any suitable combination of: wired networks, wireless networks, cell-phone networks, cellular network networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination.

Links 110, 112 comprise any suitable links for enabling device 102 and server 104 to communicate using network 108. Links 110, 112 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, the PSTN (public switched telephone network), WiFi access points, and the like, and/or a combination.

Links 112, 114-1, 114-2, 114-3 comprise any suitable links for enabling server 104 and paired computing devices 106-1, 106-2, 106-3 to communicate using network 108. Links 112, 114-1, 114-2, 114-3 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, the PSTN (public switched telephone network), WiFi access points, and the like, and/or a combination.

Link 116-1, 116-2, 116-3 comprises any suitable link for enabling device 102 and computing device 106 to communicate each other. Link 116-1, 116-2, 116-3 can hence include any suitable wired or wireless link, including but not limited to a USB (universal serial bus) cable, a serial cable, a Bluetooth link, NFC (near field communication) link, a WiFi link, WiMax link, and the like.

Device 102 will now be described in further detail. Device 102 can be any type of electronic device that can be used in a self-contained manner. Device 102 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 102 in FIG. 2 is purely an example, and contemplates a device that can be used for both wireless voice (e.g. telephony) and wireless data communications (e.g. email, web browsing, text, and the like). However, while FIG. 2 contemplates a device that can be used for telephony and messaging, in other implementations, device 102 can comprise a device configured for implementing any suitable specialized functions, including but not limited to one or more of telephony, messaging, computing, appliance, and/or entertainment related functions.

As mentioned above, device 102 includes an input device 120. Input device 120 is generally configured to receive input data, and may include any suitable combination of input devices, including but not limited to a keyboard, a keypad, a pointing device, a mouse, a track wheel, a trackball, a touchpad, a touchscreen and the like. Other suitable input devices are within the scope of present implementations.

Input from input device 120 is received at processor 118. Processor 118 may be implemented as a plurality of processors, and/or as one or more DSPs (Digital Signal Processors) including but not limited to one or more central processors (CPUs)).

Processor 118 is further configured to interact with display 122, which comprises any suitable one of, or combination of, flat panel displays (e.g. LCD (liquid crystal display), plasma displays, OLED (organic light emitting diode) displays, touch-sensitive displays such as capacitive, resistive, infrared, surface acoustic wave (SAW) touch-sensitive displays, optical touchscreen displays, CRTs (cathode ray tubes) and the like.

Processor 118 is further configured to interact with communication interface 124, which may be implemented as one or more radios and/or network adaptors and/or connectors to radios or network adaptors, configured to wirelessly communicate with one or more communication networks (not depicted). In general, communication interface 124 is configured to correspond with the network architecture that is used to implement link 110, as described above. Communication interface 124 is also configured to correspond with the architecture that is used to implement links 116-1, 116-2, 116-3. In other implementations, a plurality of links with different protocols can be employed and thus communication interface 124 can comprise a plurality of interfaces to support each link. Regardless, communication interface 124 is configured to establish a roaming cellular and/or data connection with network 108 using link 110 and to establish a data connection with computing device 106 using links 116-1, 116-2, 116-3. Indeed, any suitable combination of communication interfaces is within the scope of present implementations.

Processor 118 is further configured to interact with microphone 126 and speaker 128. Microphone 126 comprises any suitable microphone for receiving sound data. Speaker 128 comprises any suitable speaker for providing sound data, audible alerts, audible communications from remote devices, and the like, at device 102.

Processor 118 is further configured to interact with power supply 130. Power supply 130 powers components of device 102 including, but not limited to processor 118, input device 120, display 122, communication interface 124, microphone 126, speaker 128, and memory 132. Power supply 130 may include, a battery, a power pack, micro fuel cells and the like; however, in other implementations, power supply 130 may include a port (not shown) to an external power supply and a power adaptor (not shown), such as an alternating current to direct current (AC-to-DC) adaptor, that provides power to the components of device 102.

Processor 118 is also configured to communicate with memory 132 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 102 as described herein are typically maintained, persistently, in memory 132 and used by processor 118 which makes appropriate utilization of volatile storage during the execution of such programming instructions. Those skilled in the art will now recognize that memory 132 is an example of computer readable media that can store programming instructions executable on processor 118. Furthermore, memory 132 is also an example of a memory unit and/or memory device.

Device 102 also includes an operating system 134, software programs or applications 136 that control basic device operations, including data and voice communication applications, and a pairing application 138. Operating system 134, software programs or applications 136, and pairing application 138 are normally installed on the device 102 at manufacture and are typically stored in memory 132. Operating system 134, software programs or applications 136, and pairing application are executed by the processor 118. Those skilled in the art will appreciate that portions of operating system 134, software programs or applications 136 and pairing application 138, such as specific device applications, or parts thereof, may be temporarily loaded into volatile storage unit of memory 132.

Software programs or applications 136 include a message application (not shown) that can be any suitable software program that allows a user of device 102 to send and receive electronic messages. Various alternatives exist for the message application (not shown) as is well known to those skilled in the art. Messages that have been sent or received by the user are typically stored in the memory 132 of device 102 or some other suitable storage element in device 102. In at least some implementations, some of the sent and received messages may be stored remotely from device 102 such as in a data store of an associated host system that device 102 communicates with.

Software programs or applications 136 further include a device state application (not shown), a Personal Information Manager (PIM) application (not shown), and other suitable applications (not shown). The device state application provides persistence, i.e. the device state application ensures that important device data is stored in persistent memory, such as the memory 132, so that the data is not lost when the wireless communication device is turned off or loses power.

The PIM application (not shown) includes functionality for organizing and managing data items of interest to the user, such as, but not limited to, e-mail, contacts, calendar events, voice mails, appointments, and task items. A PIM application has the ability to send and receive data items via network 108. PIM data items may be seamlessly integrated, synchronized, and updated via network 108 with device 102 subscriber's corresponding data items stored and/or associated with a host computer system. This functionality creates a mirrored host computer on device 102 with respect to such items. This can be particularly advantageous when the host computer system is the portable electronic device subscriber's office computer system.

Software programs or applications 136 further include a connect application (not shown), and an information technology (IT) policy application (not shown). The connect application implements communication protocols that are required for device 102 to communicate with the wireless infrastructure and any host system, such as an enterprise system, that device 102 is authorized to interface with.

The connect application (not shown) includes a set of application program interfaces (APIs) that can be integrated with device 102 to allow device 102 to use any number of services associated with the enterprise system. The connect application allows device 102 to establish an end-to-end secure, authenticated communication pipe with the host system. A subset of applications for which access is provided by the connect application can be used to pass IT policy commands from the host system to device 102. This can be done in a wireless or wired manner. These instructions can then be passed to the IT policy application to modify the configuration of device 102. Alternatively, in some cases, the IT policy update can also be done over a wired connection.

Other types of software applications can also be installed on device 102 and stored in memory 132. These software applications can be third party applications, which are added after the manufacture of device 102. Examples of third party applications include games, calculators, utilities, etc.

In use, a received signal such as a text message, an e-mail message, or web page download is processed by communication interface 124 and input to processor 118. Processor 118 then processes the received signal for output to display 122. A subscriber may also compose data items, such as e-mail messages, for example, using display 122 and possibly input device 120. As mentioned above, input device 120 may include devices such as: a keyboard, such as, for example, a mechanical keyboard or a touch-sensitive keyboard, a mouse, track ball, infrared fingerprint detector, or a roller wheel with dynamic button pressing capability. A composed item may be transmitted over network 108 through communication interface 124.

For voice communications, the overall operation of device 102 is substantially similar, except that the received signals are output to speaker 128, and signals for transmission are generated by microphone 126. Alternative voice or audio I/O subsystems, such as a voice message recording subsystem, can also be implemented on device 102. Although voice or audio signal output is accomplished primarily through speaker 128, display 122 can also be used to provide additional information such as the identity of a calling party, duration of a voice call, or other voice call related information.

Memory 132 also stores a list 140 that identifies the computing devices that are paired with device 102. For the purposes of the present specification, a computing device in system 100 is a paired computing device when the computing device is (1) currently in communication with device 102 and (2) associated with the same platform ID as device 102. List 140 that identifies the computing devices that are paired with device 102 is referred to hereinafter as paired computing device list 140. Pairing application 138 generates and maintains paired computing device list 140 as described in further detail below.

Paired computing device list 140 may include a name associated with each paired computing device in system 100 and the computing device ID associated with each paired computing device in system 100. The name associated with each respective paired computing device may be user a created name associated with each paired computing device in order to facilitate identification of each paired computing device in the paired device list when displayed on display 122 of device 102, as described in further detail below. In an alternative implementation, paired computing device list 140 may include only the computing device ID associated with each paired computing device in system 100. Paired computing device list 140 may be stored in memory 132 as, for example, a table. An example of paired computing device list 140 stored in memory 132 is shown in Table 1 below, in which device 102 is associated with platform ID abc@xyz.com and each computing device 106-1, 106-2, 106-3 in system 100 has been determined to be a paired computing device by paring application 138.

TABLE 1

| Computing Device Name | Computing Device ID |
|---|---|
| John's Tablet | 26BB8B18 |
| John's Laptop | 35392.04.472416.6 |
| John's Computer | 00:A0:C9:14:C8:29 |

As mentioned above, memory 132 also includes pairing application 138. Pairing application 138 is configured to, when executed by processor 118, generate and maintain stored paired computing device list 140. In an example implementation, pairing application 138 generates paired computing device list 140 by determining which computing devices in system 100 are paired with device 102.

In the example implementation shown in FIG. 1, system 100 includes three computing devices 106-1, 106-2, 106-3. Thus, pairing application 138, for this example implementation, determines which computing devices 106-1, 106-2, 106-3 are paired with device 102. Paring application 138 determines whether computing device 106-1 is currently in communication with device 102 via link 116-1. When pairing application 138 determines that computing device 106-1 is currently in communication with device 102 via link 116-1, pairing application 138 then determines whether computing device 106-1 is associated with the same platform ID as device 102. Pairing application 138 determines whether computing device 106-1 is associated with the same platform ID as device 102 by obtaining, from either computing device 106-1 or server 104, the platform ID associated with computing device 106-1. In an example implementation, pairing application 138 may obtain the platform ID associated with computing device 106-1 by querying computing device 106-1 for the platform ID. Alternatively, pairing application 138 may obtain the platform ID associated with computing device 106-1 by querying server 104 for the platform ID associated with computing device 106.

Upon obtaining the platform ID for computing device 106-1, pairing application 138 compares the platform ID associated with device 102 with the obtained platform ID associated with computing device 106-1. When the platform ID associated with device 102 matches the platform ID associated with computing device 106-1, pairing application 138 determines that computing device 106-1 is paired with device 102. Upon determining that computing device 106-1 is a paired computing device, pairing application 138 obtains, from computing device 106-1, the name associated with computing device ID and/or the computing device ID associated with computing device 106-1 and stores the name and/or the computing device ID associated with computing device 106-1 in paired computing device list 140, which indicates that computing device 106-1 is a paired computing device.

Pairing application 138 determines whether paired computing devices 106-2, 106-3 are (1) currently in communication with device 102 via respective links 116-2, 116-3 and (2) associated with the same platform ID as device 102 in a similar manner as described above. Pairing application 138 determines whether computing device 106-2 is currently in communication with device 102 via link 116-2. When paring application 138 determines that computing device 106-2 is currently in communication with device 102 via link 116-2, pairing application 138 then determines whether computing device 106-2 is associated with the same platform ID as device 102. Pairing application 138 determines whether computing device 106-2 is associated with the same platform ID as device 102 by obtaining, from either computing device 106-2 or server 104, the platform ID associated with computing device 106-2 and comparing the platform ID associated with device 102 with the platform ID associated with computing device 106-2. When the platform ID associated with device 102 matches the platform ID associated with computing device 106-2, pairing application 138 determines that computing device 106-2 is paired with device 102. Upon determining that computing device 106-2 is a paired with device 102, pairing application 138 obtains, from computing device 106-2, the name associated with computing device ID and/or the computing device ID associated with computing device 106-2 and stores the name and/or the computing device ID associated with computing device 106-2 in paired computing device list 140, which indicates that computing device 106-2 is a paired computing device.

Pairing application 138 also determines whether computing device 106-3 is currently in communication with device 102 via link 116-3. When paring application 138 determines that computing device 106-3 is currently in communication with device 102 via link 116-3, pairing application 138 then determines whether computing device 106-3 is associated with the same platform ID as device 102. Pairing application 138 determines whether computing device 106-3 is associated with the same platform ID as device 102 by obtaining, from either computing device 106-3 or server 104, the platform ID associated with computing device 106-3 and comparing the platform ID associated with device 102 with the platform ID associated with computing device 106-3. When the platform ID associated with device 102 matches the platform ID associated with computing device 106-3, pairing application 138 determines that computing device 106-3 is paired with device 102. Similarly, determining that computing device 106-3 is a paired with device 102, pairing application 138 obtains, from computing device 106-3, the name associated with computing device ID and/or the computing device ID associated with computing device 106-3 and stores the name and/or the computing device ID associated with computing device 106-3 in paired computing device list 140, which indicates that computing device 106-3 is a paired computing device.

Paring application 138 is also configured to, when executed by processor 118, to maintain paired computing device list 140. Pairing application 138 maintains paired computing device list by updating the paired computing device list 140 in real-time or periodically. Pairing application 138 may update the paired computing device list 140 by periodically querying each paired computing device 106. Alternatively, pairing application 138 may update the paired computing device list 140 by or by periodically querying server 104. Alternatively, paring application 138 may update the paired computing device list 140 in real time. For example, pairing application 138 may remove the computing device ID associated with paired computing device 106-1 from paired computing device list 140 when device 102 no longer detects communication with computing device 106-1. Similarly, pairing application 138 may remove the computing device ID associated with paired computing device 106-2 from paired computing device list 140 when device 102 no longer detects communication with computing device 106-2 and pairing application 138 may remove the computing device ID associated with paired computing device 106-3 from paired computing device list 140 when device 102 no longer detects communication with computing device 106-3.

Pairing application 138 may also update paired computing device list 140 when computing device 106-1 is no longer associated with the same platform ID as device 102. For example, pairing application 138 may receive a message from server 104 indicating that paired computing device 106-1 is no longer associated with the same platform ID as device 102. Upon receipt of the message, pairing application 138 may remove the computing device ID associated with paired computing device 106-1 from paired computing device list 140. Similarly, pairing application 138 may also update paired computing device list 140 when computing device 106-2 is no longer associated with the same platform ID as device 102 or when computing device 106-3 is no longer associated with the same platform ID as device 102. For example, the message received from server 104 indicating that paired computing device 106-1 is no longer associated with the same platform ID as device 102 may also indicate that computing device 106-2 and/106-3 is no longer associated with the same platform ID as device 102. Upon receipt of the message, pairing application 138 may remove the computing device ID associated with paired computing device 106-2 and/or computing device 106-3 from paired computing device list 140.

Attention is now directed to FIG. 2 in which a front view of an example of device 102 is shown. Device 102 includes a body 202 that includes a back, sidewalls, and a front face 204. In the example implementation shown in FIG. 2, display 122 is a touchscreen display and is disposed in body 202 and exposed at the front face 203 for user-interaction.

Display 122 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

Figure 3:
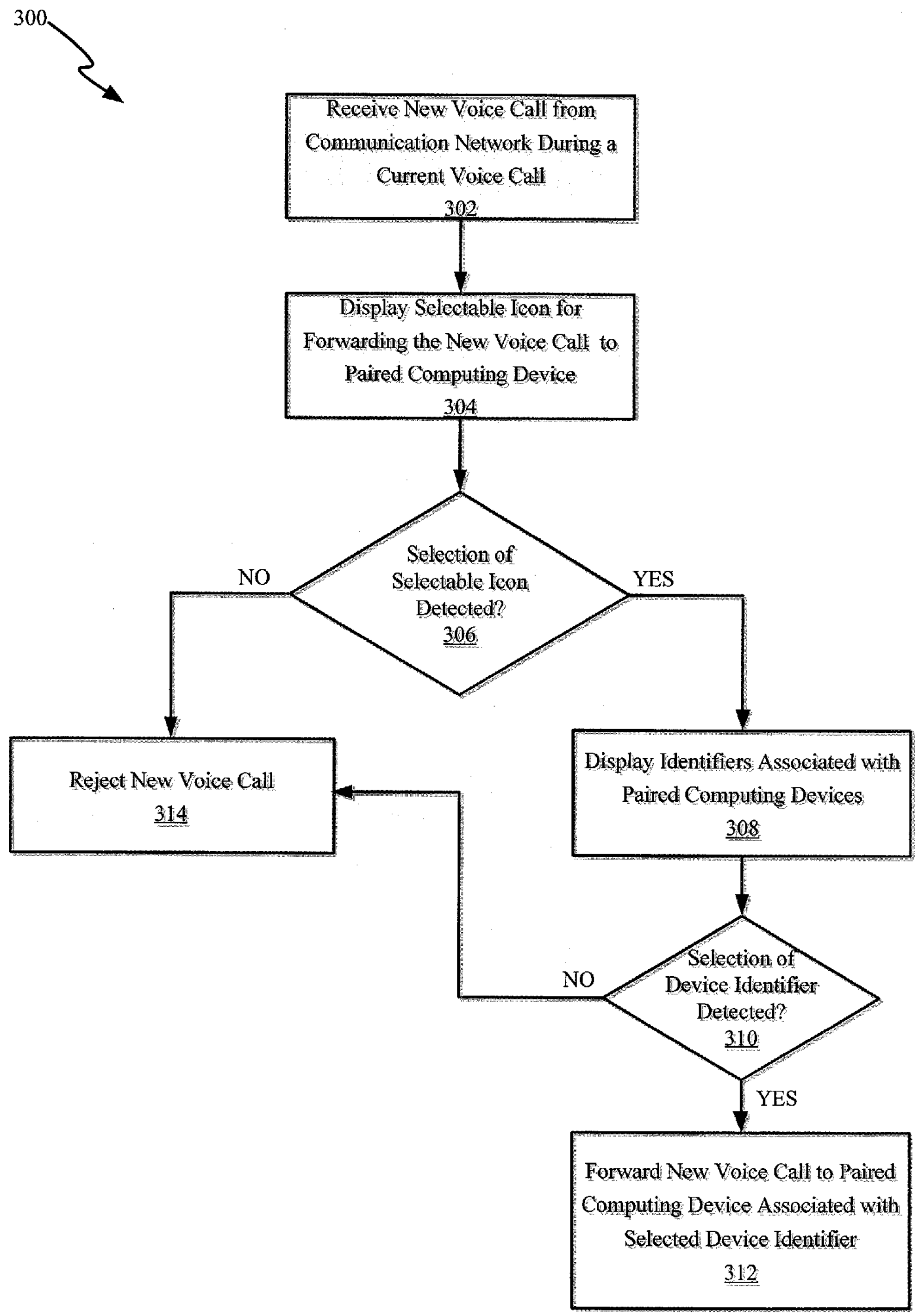
FIG. 3 is a flowchart of a method of forwarding a new voice call from the mobile communication device in the system of FIG. 1 to a paired computing device, in accordance with an example implementation of the present specification.

Attention is now directed to FIG. 3 to describe an example implementation of a method 300 of forwarding calls received at device 102 to a paired computing device. Method 300 may be carried out by routines or subroutines of software executed by the processor 118. Coding of software for carrying out for carrying out such steps is well within the scope of a person of ordinary skilled in the art having regard to the present specification. Method 300 may contain additional or fewer processes than shown and described, and may be performed in a different order. Computer-readable code executable by, for example, processor 118 of device 102 to perform method 300, may be stored in a computer-readable medium.

Regardless, it is to be emphasized, that method 300 of FIG. 3 need not be performed in the exact sequence as shown, unless otherwise indicated; and likewise various blocks may be performed in parallel rather than in sequence; hence the elements of method of FIG. 3 are referred to herein as “blocks” rather than “steps”. It is also to be understood, however, that method 300 of FIG. 3 can be implemented on variations of device 102 as well.

Method 300 begins at block 302 where device 102 receives at a new voice call (referred to hereinafter as the new voice call) from network 108 while a current voice call is active on device 102.

In an example implementation, the current voice call may be a cellular call received from a base station (not shown) of network 108 and the new voice call may be a voice data call received from network 108, such as, for example, a Voice over Internet Protocol (VoIP) call or a voice and/or video call associated with a service of the set of services associated with platform 156, such as, for example, Blackberry Messenger™ or Skype™.

In another example implementation, the current voice call may be a data voice call received from network 108, such as, for example, a VoIP call or a voice and/or video call associated with a service of the set of services associated with platform 156, such as, for example, Blackberry Messenger™ or Skype™ and the new voice call may be a cellular voice call received from a base station (not shown) of network 108.

In still another example implementation, the current voice call may be a first data voice call received from network 108 and the new voice call may be a second data voice call received from network 108. The first data voice call may be for example, a VoIP call and the second voice call may be a voice and/or video call associated with a service of the set of services associated with platform 156. Alternatively, the first voice data call may be a voice and/or video call associated with one service of the set of services associated with platform 156, such as, for example Blackberry Messenger™, and the second voice data call may be a voice and/or video call associated with one service of the set of services associated with platform 156, such as for example, Skype™.

After the new voice call is received at block 302, method 300 proceeds to block 304. At block 304, processor 118 displays, on display 122 of device 102, a selectable icon for forwarding the new voice call to a paired computing device, such as for example computing device 106. In another example implementation, at block 304, device may also display, on display 122 of device 102 a second selectable icon for rejecting the new voice call. In still another example implementation, processor 118, at block 304, device may also display, on display 122 of device 102 third selectable option for answering the new voice call. Method 300 then proceeds to block 306.

At block 306, processor 118 determines whether selection of the selectable icon has been detected. When processor 118, at block 306, detects selection of the selectable icon at block 306, method 300 proceeds to block 308. When processor 118, at block 306, does not detect selection of the selectable icon, the method proceeds to block 314.

At block 308, processor 118 retrieves from memory 132, paired computing device list 140 and displays, on display 122 of device 102, each paired computing device ID included in paired computing device list 140 and method 300 proceeds to block 310. In the example implementation shown in FIGS. 1, 2, and 3, the paired computing device ID associated with each respective paired computing device 106-1, 106-2, 106-3 is displayed on display 122 at block 308.

At block 310, processor 118 determines whether selection of one of the computing device ID's of the computing device ID's displayed on display 122 is detected. When processor 118 detects selection of one of the computing device ID's of the computing device ID's displayed on display 122, method 300 proceeds to block 312. When processor 118 does not detect selection of one of the computing device ID's of the computing device ID's displayed on display 122 within a first predetermined time period at block 310, method 300 proceeds to block 314. In the example implementation shown in FIGS. 1, 2, and 3, when processor 118 detects selection of the computing device ID associated with any one of paired computing devices 106-1, 106-2, 106-3, method 300 proceeds to block 312.

At block 312, processor 118 forwards the new voice call to the paired computing device associated with the selected computing device ID during the current voice call (i.e. while the current voice call is active on device 102) without terminating the current voice call to enable the paired computing device associated with the selected computing device ID to answer the new voice call. In the example implementation shown in FIGS. 1, 2 and 3, when processor 118 detects selection of the computing device ID associated with paired computing device 106-1, processor 118 forwards the new voice call to paired computing device 106-1 associated with the selected computing device ID without terminating the current voice call. Similarly, when processor 118 detects selection of the computing device ID associated with paired computing device 106-2, processor 118 forwards the new voice call to paired computing device 106-1 associated with the selected computing device ID without terminating the current voice call and when processor 118 detects selection of the computing device ID associated with paired computing device 106-2, processor 118 forwards the new voice call to paired computing device 106-3 associated with the selected computing device ID without terminating the current voice call. Thus, device 102 acts as a bridge that enables the new voice call to be active on the paired computing device associated with the selected computing device ID while the current voice call is active on device 102.

In an example implementation, when processor 118, detects, at block 310, selection of the computing device ID associated with paired computing device 106-1, processor 118, at block 312, forwards the new voice call to paired computing device 106-1 associated with the selected computing device ID during the current voice call by: (1) establishing a communication session between device 102 and paired computing device 106-1 on link 116-1; and (2) transferring the new voice call using the new communication session. Processor 118 may establish a communication session on link 116-1 with paired computing device 106-1 using any suitable protocol that enables paired computing device 106-1 to receive and answer the new call, such as, for example, the Session Initiation Protocol (SIP).

In an example implementation, when the current voice call is a VoIP call received from network 108 using a first SIP session and the new voice call is a cellular voice call received from a base station (not shown) of network 108, processor 118 forwards the new voice call to paired computing device 106-1 associated with the selected computing device ID during the current voice call at block 312 by: (1) transforming the cellular voice call into a VoIP call, establishing a communication between device 102 and paired computing device 106-1 associated with the selected computing device ID on link 116-1 using the SIP protocol (referred to hereinafter as a second SIP session), and transferring the transformed VoIP call to paired computing device 106-1 using the second SIP session. In this example implementation, the current voice call (i.e., the VoIP call) remains active on device 102 and the first SIP session accesses microphone 126 and speaker 128 of device 102. Also, in this example implementation, paired computing device 106-1 sends to device 102 an answer call command when a user of paired computing device 106-1 answers the new voice call at paired computing device 106-1 and processor 118, in response to receipt of an answer call command from paired computing device 106-1, answer the new voice call using the cellular circuit. Also in this example implementation, the second SIP session includes permissions for accessing a microphone and speaker of paired computing device 106-1 while the transformed VoIP call is being transferred to the paired computing device 106-1 using the second SIP session. When the second SIP session is terminated, the permissions of the microphone and the speaker of paired computing device 106 are released.

In another example implementation, when the current voice call is a cellular voice call from a base station (not shown) of network 108 and the new voice all is a data voice call received from network 108, processor 118 forwards the new data voice call to paired computing device 106-1 at block 312 by: (1) establishing a communication session between device 102 and paired computing device 106-1 on link 116-1 using the same protocol as the new data voice call; and (2) the transferring the new data voice call to paired computing device 106 using the established communication session.

When processor 118, detects, at block 310, selection of the computing device ID associated with paired computing device 106-2, forwards the new voice call to paired computing device 106-2 associated with the selected computing device ID during the current voice call in a similar manner as described above. Similarly, when processor 118, detects, at block 310, selection of the computing device ID associated with paired computing device 106-3, forwards the new voice call to paired computing device 106-3 associated with the selected computing device ID during the current voice call in a similar manner as described above.

As mentioned above, when processor 118, at block 306, does not detected selection of the selectable icon within a first predetermined time period, method 300 proceeds to block 314 and processor 118 ignores the new voice call. Also, when processor 118, at block 310, does not detect selection of a computing device ID displayed on display 122 within a second predetermined time period, method 300 proceeds to block 314 where processor 118 ignores the second voice call and method 300 ends. The first and second predetermined time periods may be equal or different.

In another example implementation, at block 304, processor 118 may detect selection of the second selectable icon for rejecting the new voice call. When processor 118 detects selection of the second selectable option for rejecting the new voice call, processor 118, ignores the new voice call.

In still another alternative implementation, at block 304, processor 118 may detect selection of the third selectable icon for answering the new voice call. When processor 118 detects selection of the third selectable icon for answering the new voice call, processor 118 answers, using communication interface 124 the new voice call and terminates (i.e., disconnects) the current voice call.

An example implementation of method 300 will now be discussed with reference to FIGS. 4, 5, 6, 7, 8, and 9, with FIG. 4 and FIG. 9 being substantially similar to FIG. 1, with like elements having like numbers. In the example implementation shown in FIGS. 4, 5, 6, 7, 8, and 9, computing devices 106-1, 106-2, 106-3 are each paired computing device and the computing device ID associated with each computing device 106-1, 106-2, 106-3 is included in paired computing device list 140. Also, in the example implementation, link 116-1 comprises a wireless local area network (WLAN), link 116-2 comprises a Bluetooth™ link, and link 116-3 comprises a Universal Serial Bus (USB) link. Device 102 and computing device 106-1 are configured to communicate using the IEEE 802.11 protocol. Device 102 and computing device 106-2 are configured to communicate using the Bluetooth™ standard and device 102 and computing device 106-3 are configured to communicate using the USB standard.

Figure 4:
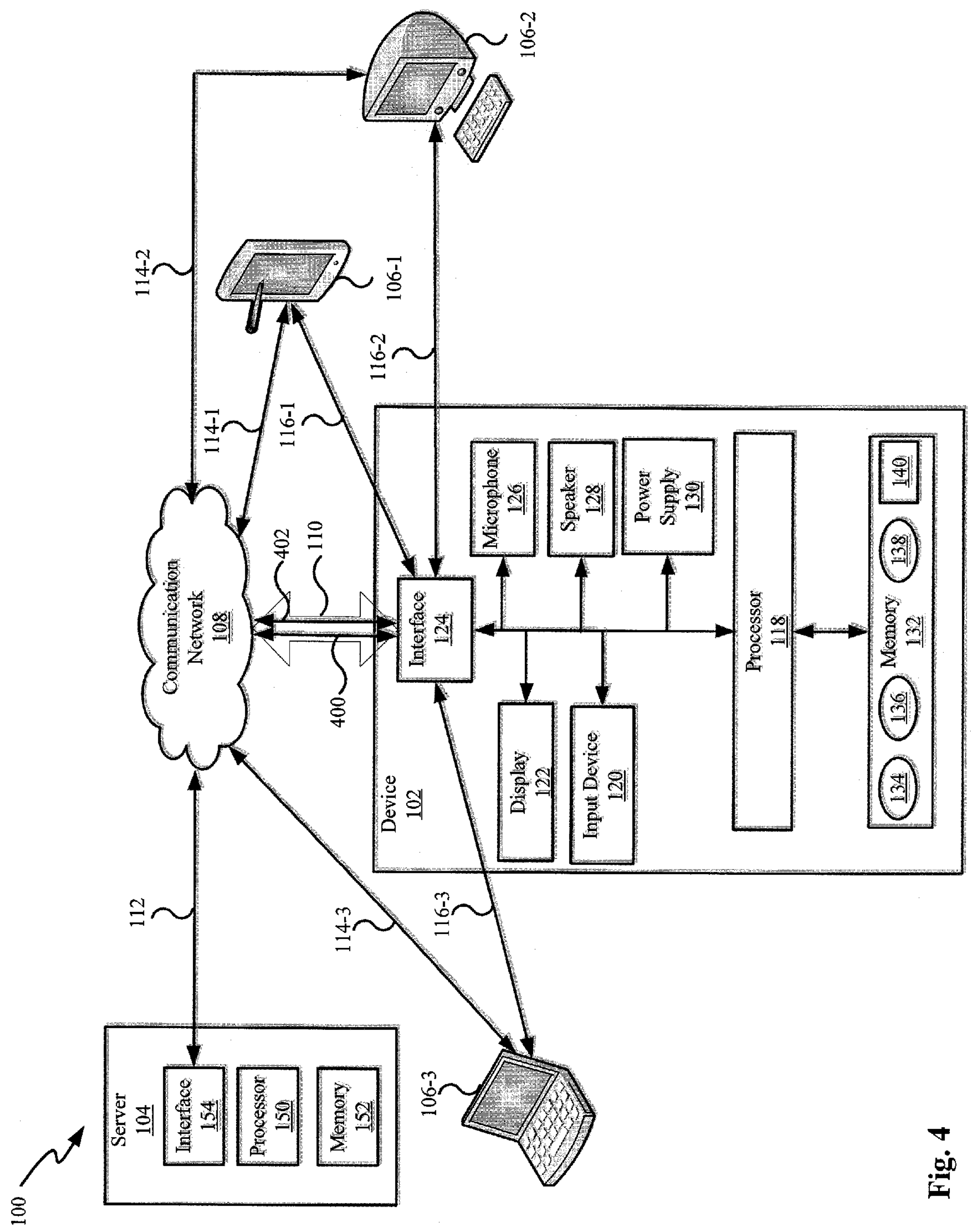
FIG. 4 is a block diagram of a communication system of FIG. 1, with the mobile communication device of FIG. 2 receiving a new voice call during a current voice call, in accordance with an example implementation of the present specification.

Attention is directed to FIG. 4 which depicts a new voice call 402 being received at device 102 while a current voice call 400 is active at device 102. In the example implementation, current voice call 400 is a VoIP call and new voice call 402 is a cellular voice call.

Figure 5:
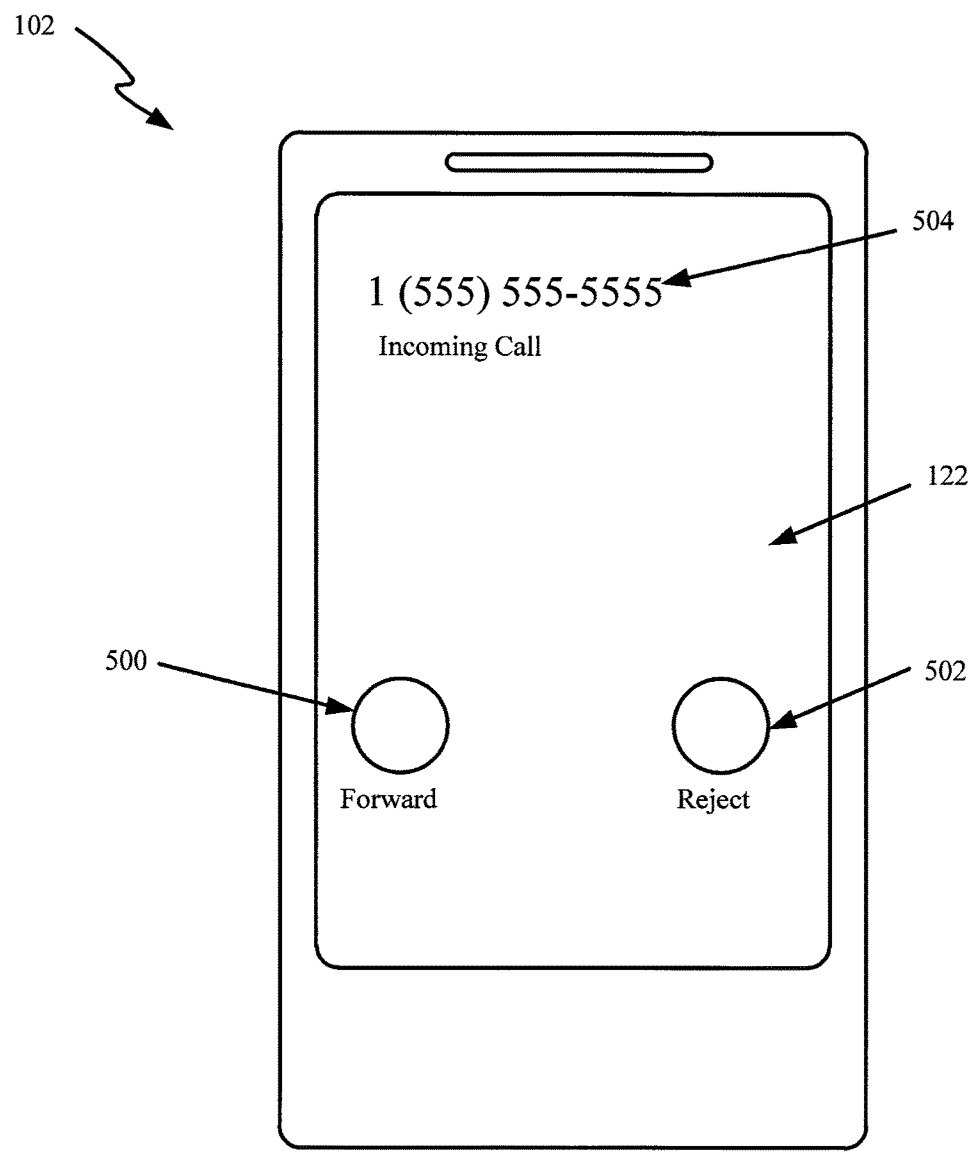
FIG. 5 is a front view of the mobile communication device in the system of FIG. 1 in which a selectable option for forwarding a new voice call is displayed, in accordance with an example implementation of the present specification.

Attention is next directed to FIG. 5 which depicts processor 118 displaying, at block 304, a selectable icon 500 on display 122 of device 102 for forwarding new voice call 402. Also depicted in FIG. 5 is processor 118 displaying a second selectable icon 502 for rejecting new voice call 402 on display 122 of device 102 and a field comprising a phone number 504 associated with new voice call 402.

Figure 6:
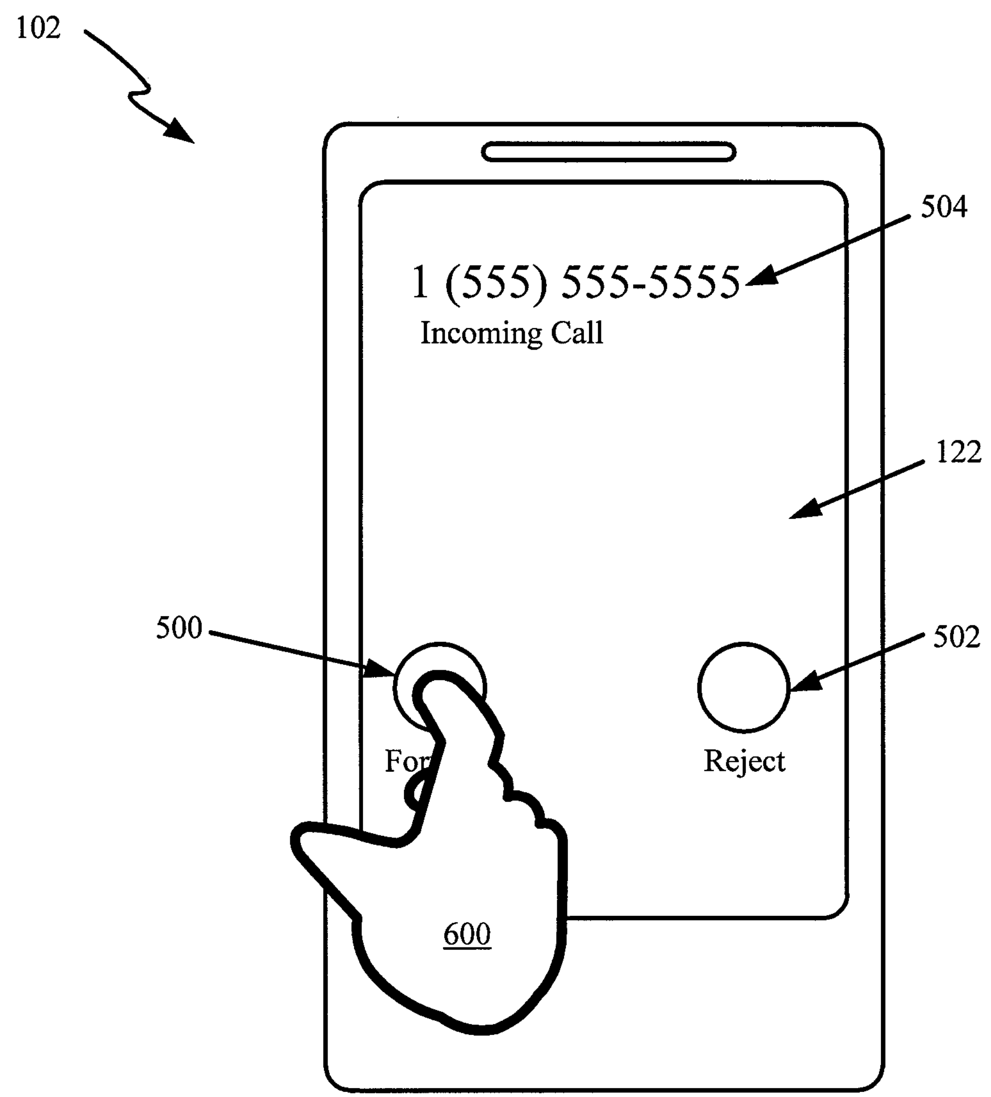
FIG. 6 is a front view of the mobile communication device in the system of FIG. 5 which depicts the selectable option for forwarding a new voice call being selected, in accordance with an example implementation of the present specification.

Attention is next directed to FIG. 6, which depicts a hand 600 of a user interacting with display 122. In the example implementation shown in FIGS. 4, 5, and 6, display 122 is a touchscreen display and hand 600 is depicted as touching selectable icon 500 to indicate selection of selectable icon 500. In FIG. 6, processor 118 detects, at block 306, selection of selectable icon 500 by hand 600 and retrieves from memory paired device list 140.

Figure 7:
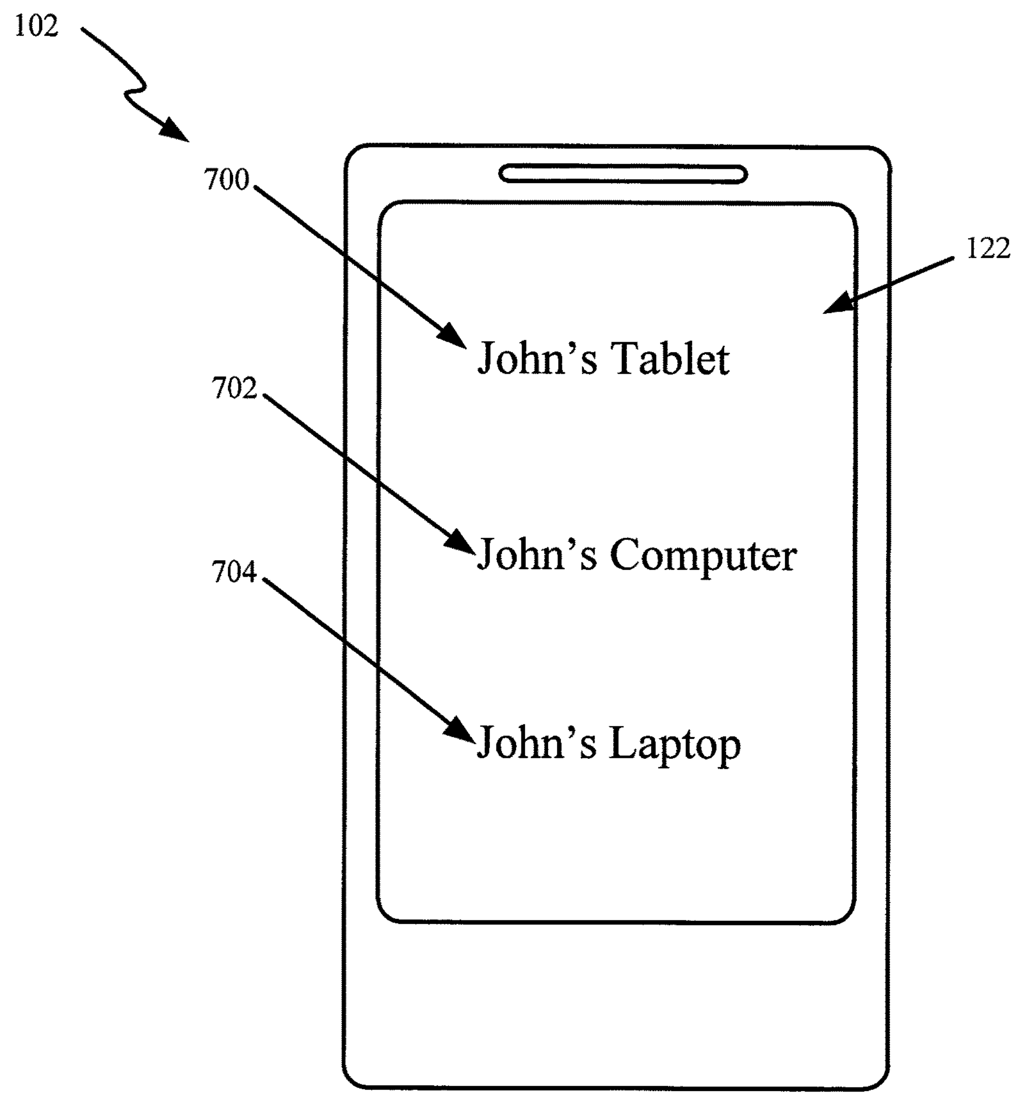
FIG. 7 is a front view of the mobile communication device in the system of FIG. 1 in which a paired device list is displayed, in accordance with an example implementation of the present specification.

Attention is next directed to FIG. 7 in which the computing device ID's included in the retrieved paired device list 140 are displayed on display 122. In FIG. 7 computing device ID 700 for "John's Tablet", computing device ID 702 for "John's Computer", and computing device ID 704 for "John's Laptop" are displayed on display 122.

Figure 8:
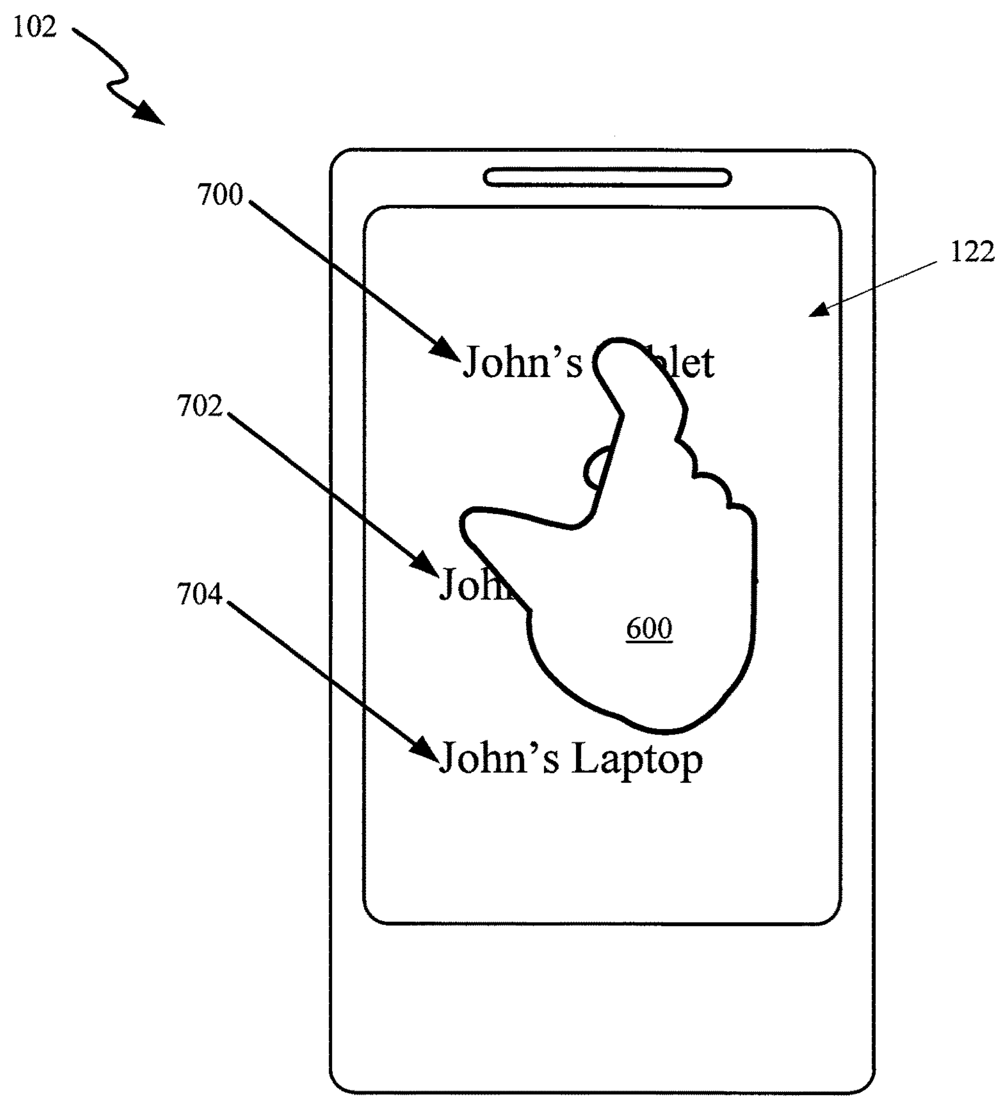
FIG. 8 is a front view of the mobile communication device in the system of FIG. 6, which depicts a device identifier of the paired device list being selected, in accordance with an example implementation of the present specification.

Attention is next directed to FIG. 8 which depicts hand 600 interacting with display 122. In FIG. 8, hand 600 is depicted as touching computing device ID 700 "John's Tablet" to indicate selection of computing device ID 700 "John's Tablet". Processor 118 detects, at block 310, selection of computing device ID 700 by hand 600.

Figure 9:
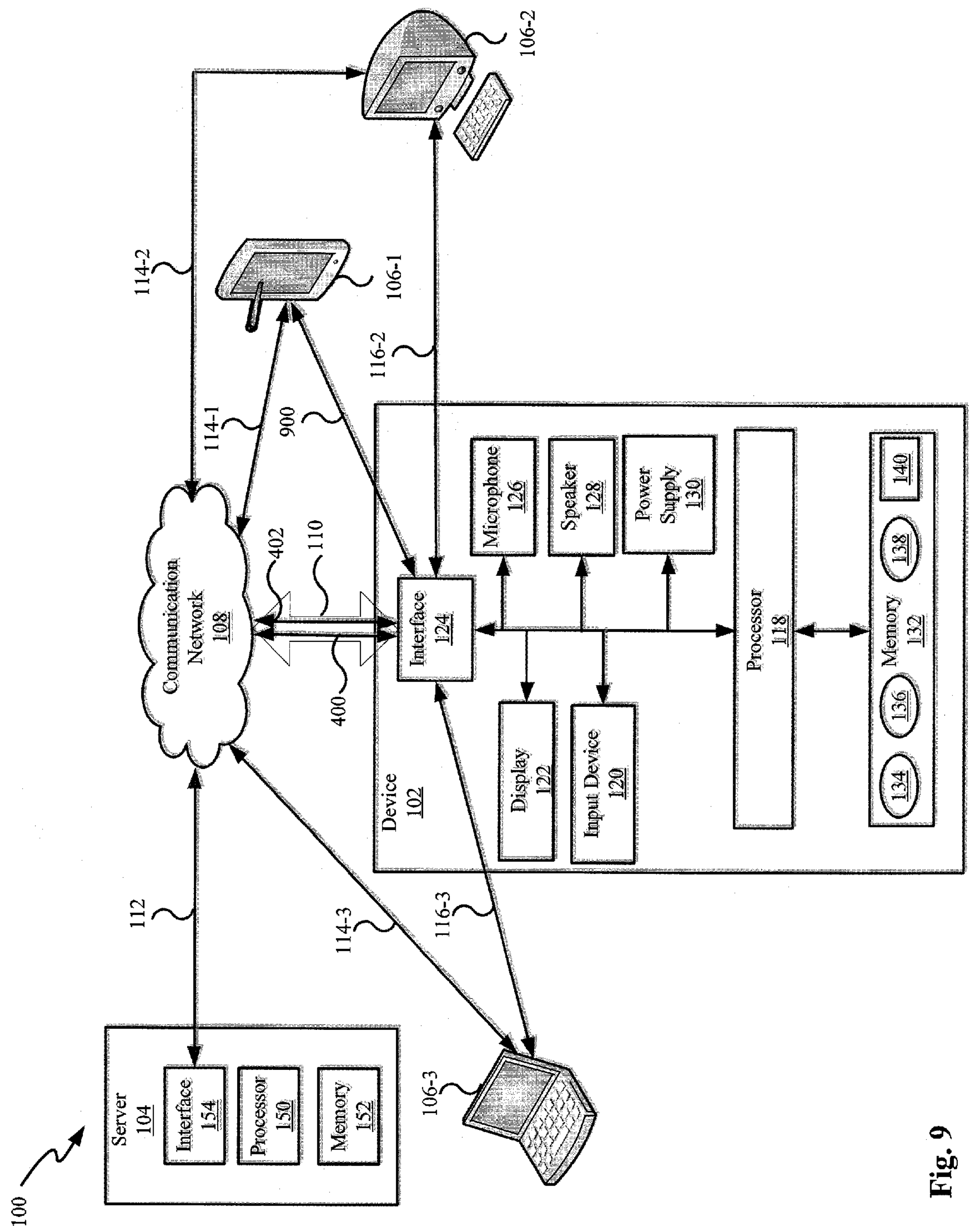
FIG. 9 is a block diagram of a communication system of FIG. 1, with the mobile communication device of FIG. 2 forwarding the new voice call a paired computing device, in accordance with an example implementation of the present specification.

Attention is next directed to FIG. 9, which depicts processor 118 of device 102 forwarding, at block 312, new voice call 402 to paired computing device 106-1 associated with computing device ID 700 while current voice call 400 remains active at device 102 and without terminating current voice call 400 to enable paired computing device 106 associated with computing device ID 700 to answer new voice call 402. In FIG. 9, processor 118 establishes a communication session 900 between device 102 and paired computing device 106-1 associated with computing device ID 700 on link 116-1 using the SIP protocol (referred to hereinafter as a second SIP session 900), transforms the new voice call 402 into a VoIP data call, and transfers the VoIP data call to paired computing device 106 associated with computing device ID 700 using the second SIP session 900. In this example implementation, the first SIP session accesses microphone 126 and speaker 128 of device 102 and the second SIP session 900 includes permissions for accessing a microphone and speaker of paired computing device 106-1 associated with computing device ID 700 while the transformed VoIP call is being transferred to computing device 106 associated with computing device ID 700 using the second SIP session 900. Also, the cellular circuitry (not shown) in communication interface 124 of device 102 remains working as the cellular circuitry acts as a relay for paired computing device 106-1 associated with computing device ID 700.

Another example implementation of method 300 will now be discussed with reference to FIGS. 10, 11, 12, 13, 14, and 15, with system 1000 shown in FIG. 10, and FIG. 15 being substantially similar to FIG. 1, with like elements having like numbers. In the example implementation shown in FIGS. 10, 11, 12, 13, 14, and 15, system 1000 device 102 is configured to communicate with a single computing device 106-4 via link 116-1 and computing device 106-4 is configured to communicate with server 104 using links 114-4 and 112. Link 114-4 is similar to link 114-1, . . . , 114-3 described above. Also in the example implementation shown in computing device 106-4 is a paired computing device (i.e., computing device 106-4 is in currently in communication with device 102 and associated with the same platform ID as device 102). Also, in the example implementation, link 116-4 comprises an Ethernet connection.

Figure 10:
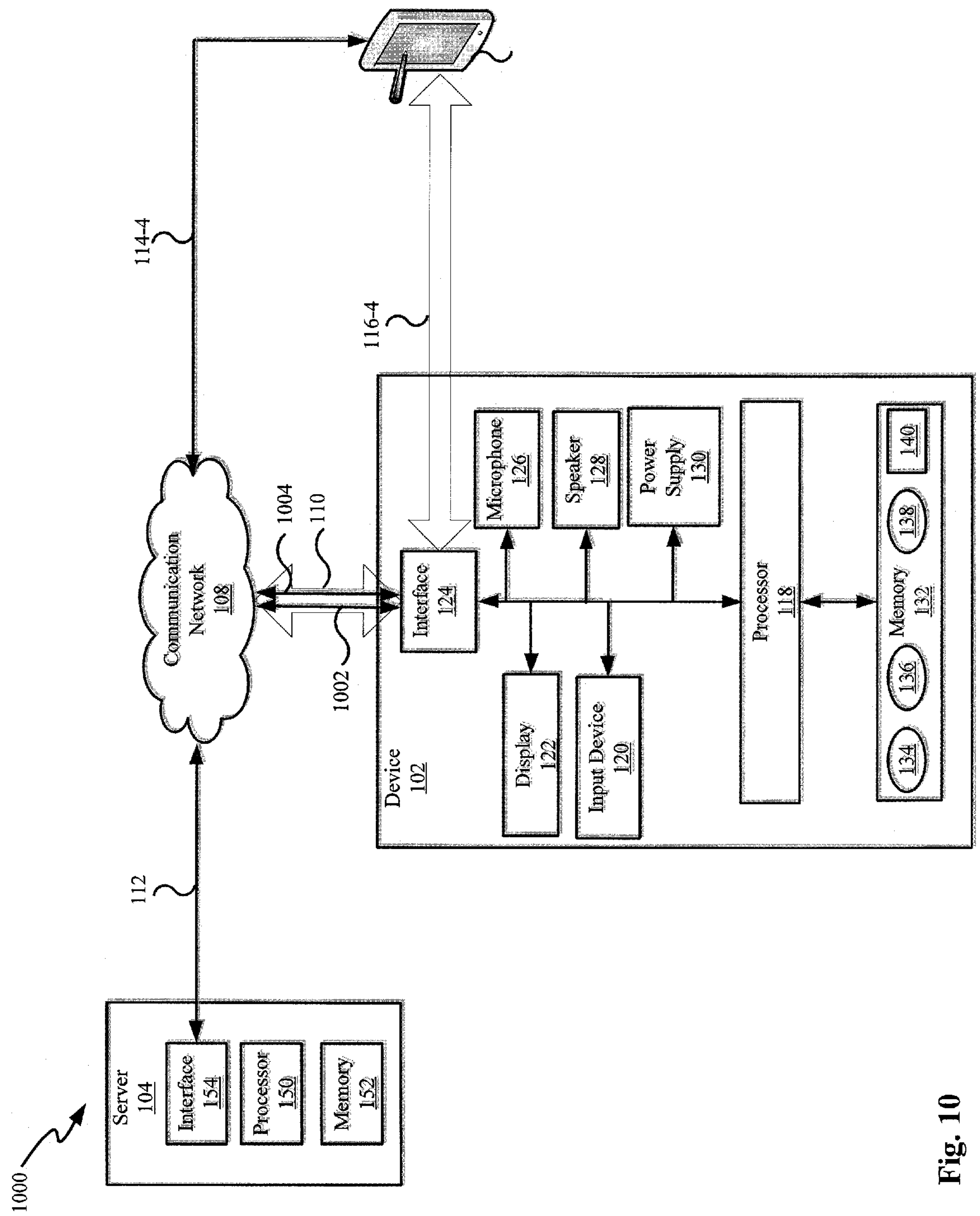
FIG. 10 is a block diagram of a communication system, in accordance with another example implementation of the present specification.

Attention is directed to FIG. 10 which depicts a new voice call 1004 being received at device 102 while a current voice call 1002 is active at device 102. In the example implementation, current voice call 1002 is a cellular voice call and the new voice call 1004 is a data voice and/or video call associated with a service of the set of services associated with platform 156, such as, for example, Blackberry Messenger™.

Figure 11:
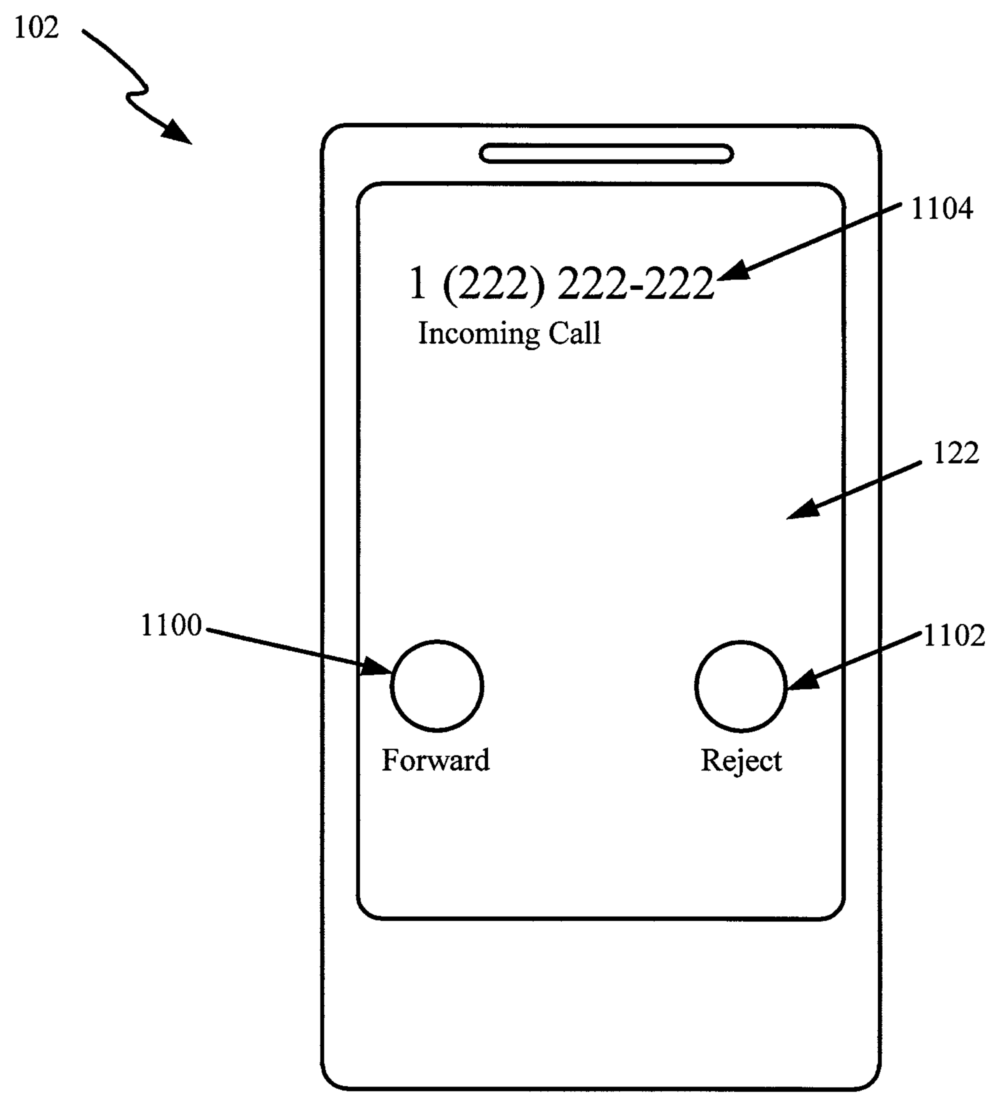
FIG. 11 is a front view of the mobile communication device in the system of FIG. 10 in which a selectable option for forwarding a new voice call is displayed, in accordance with another example implementation of the present specification.

Attention is next directed to FIG. 11 which depicts processor 118 displaying, at block 304, a selectable icon 1100 on display 122 of device 102 for forwarding new voice call 1004. Also depicted in FIG. 11 is processor displaying a second selectable icon 1102 for rejecting new voice call 1004 on display 122 of device 102, a third selectable option for rejecting new voice call 1004 on display 122 of device 102, and a field comprising phone number 1106 associated with new voice call 1004.

Figure 12:
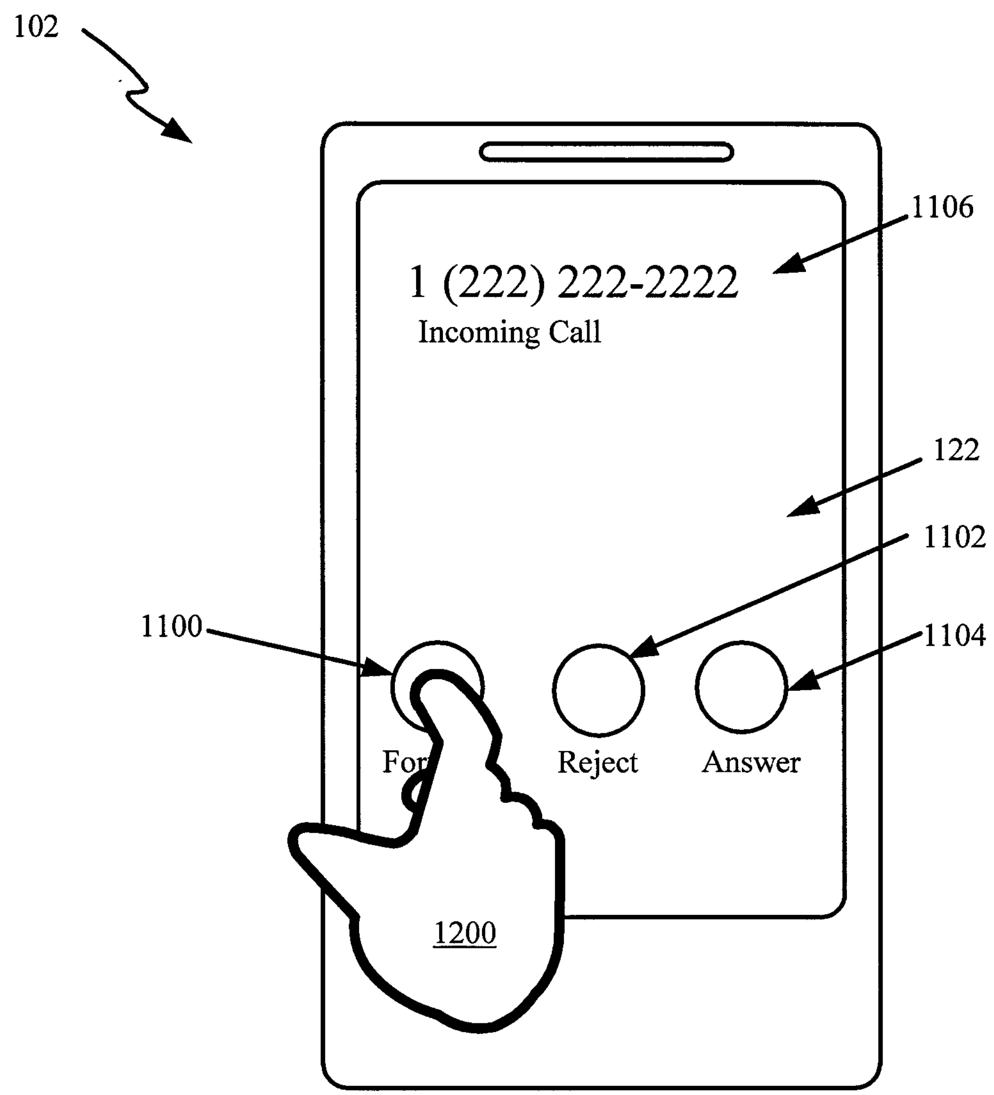
FIG. 12 is a front view of the mobile communication device in the system of FIG. 11 which depicts the selectable option for forwarding a new voice call being selected, in accordance with an example implementation of the present specification.

Attention is next directed to FIG. 12, which depicts a hand 1200 of a user interacting with display 122. In the example implementation shown in FIGS. 10, 11, 12, 13, 14, and 15, display 122 is a touchscreen display and hand 1200 is depicted as touching selectable icon 1100 to indicate selection of icon 1110. In FIG. 12, processor 118 detects, at block 306, selection of selectable icon 1100 by hand 1200 and retrieves from memory paired computing device list 140.

Figure 13:
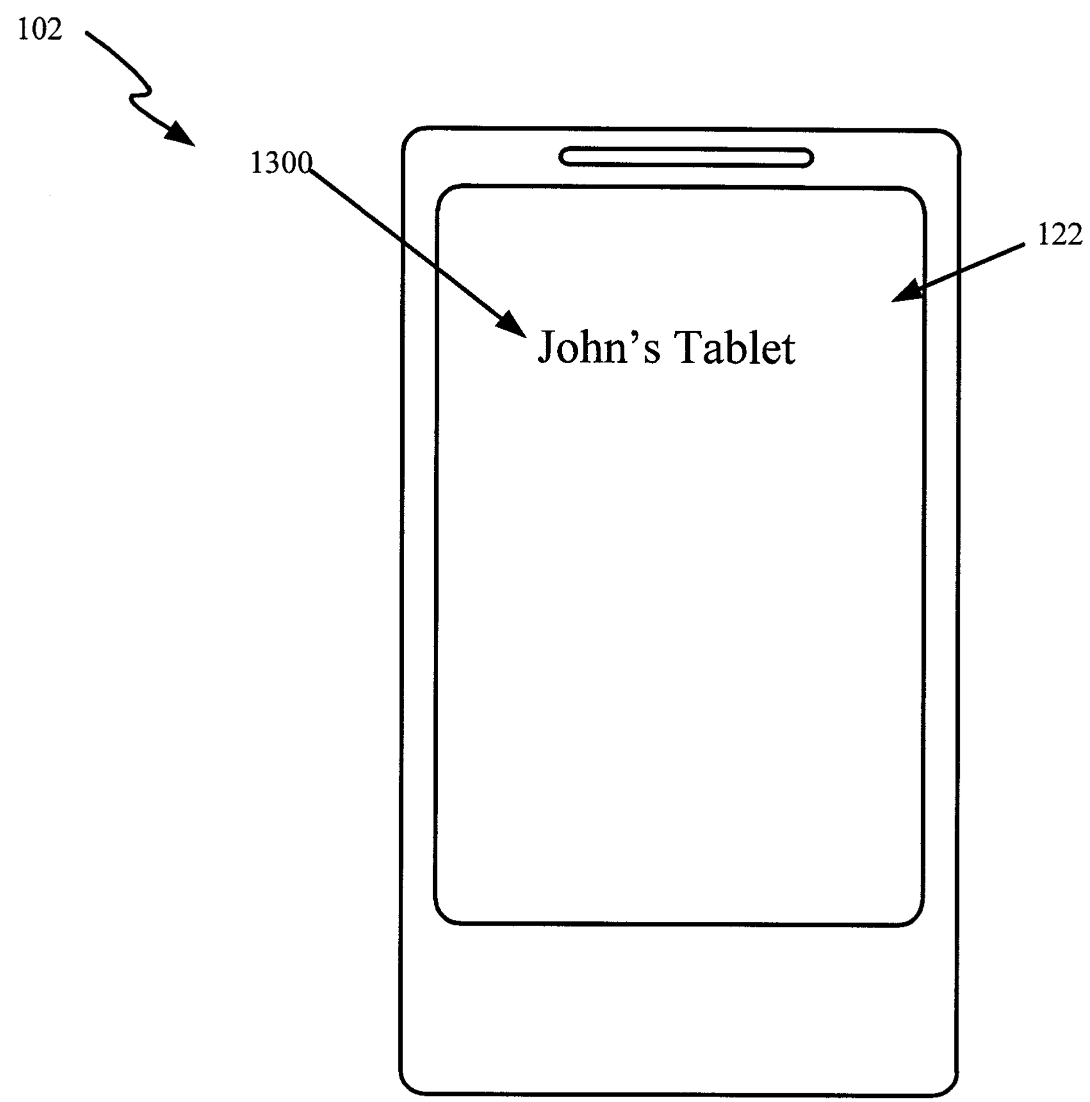
FIG. 13 is a front view of the mobile communication device in the system of FIG. 10 in which a paired device list is displayed, in accordance with another example implementation of the present specification.

Attention is next directed to FIG. 13 in which the computing device ID's included in the retrieved paired device list 140 are displayed on display 122. In FIG. 13 computing device ID 1300 for "John's Tablet" is displayed on display 122.

Figure 14:
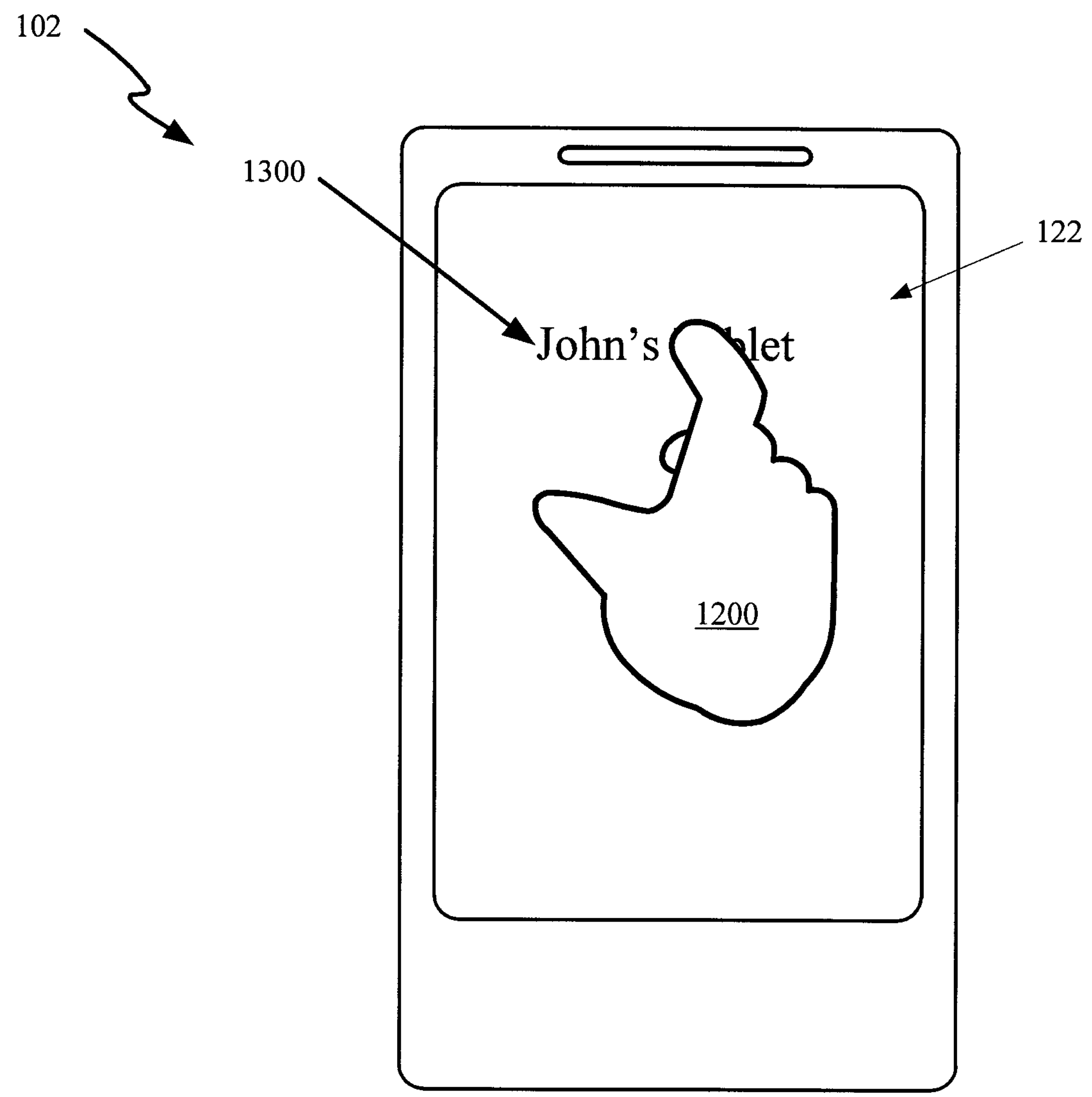
FIG. 14 is a front view of the mobile communication device in the system of FIG. 13, which depicts a device identifier of the paired device list being selected, in accordance with an example implementation of the present specification.

Attention is next directed to FIG. 14 which depicts hand 600 interacting with display 122. In FIG. 14, hand 1200 is depicted as touching computing device ID 1300 to indicate selection of computing device ID 1300. In FIG. 14, processor 118 detects, at block 310, selection of computing device ID 1300 by hand 600.

Figure 15:
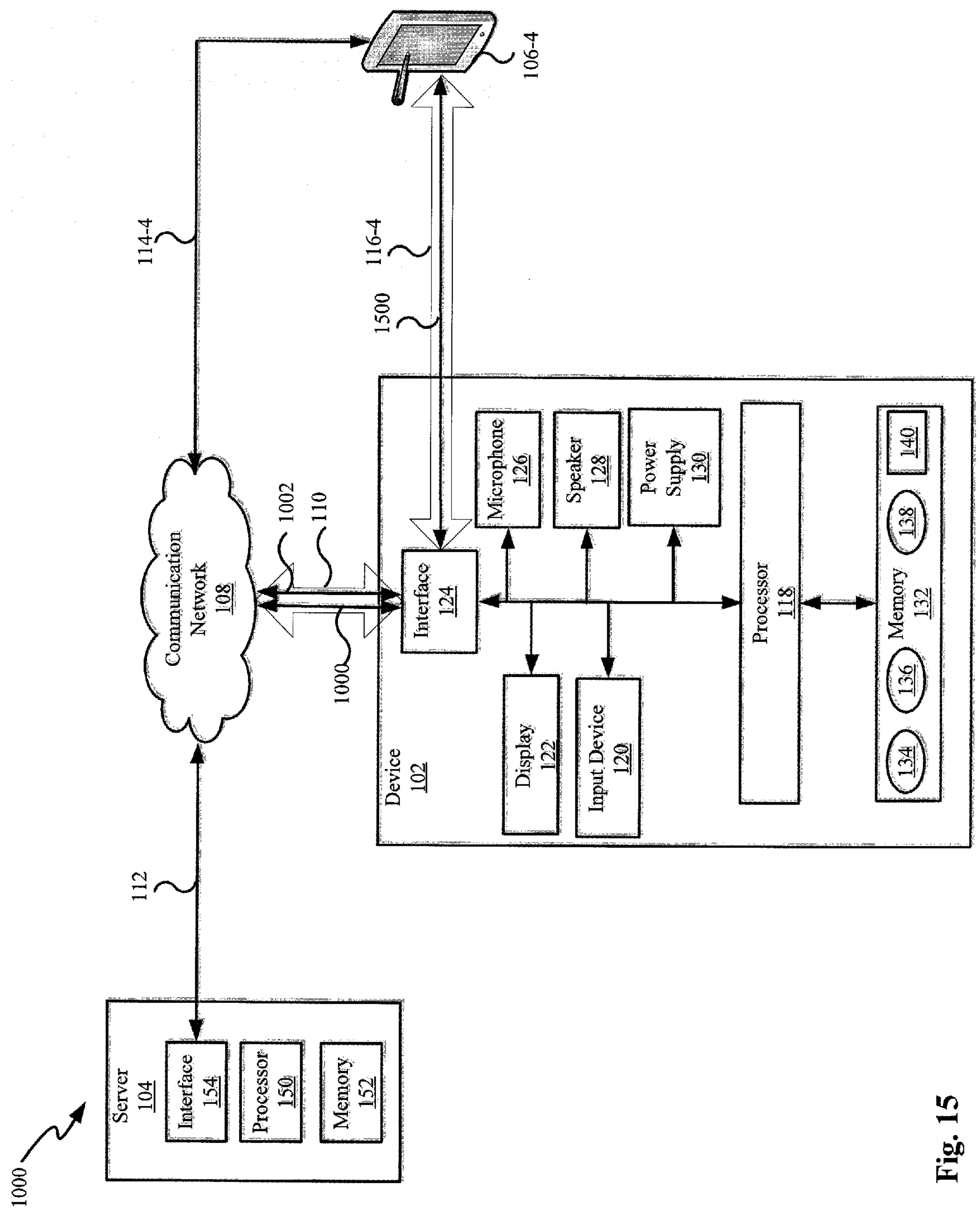
FIG. 15 is a block diagram of a communication system of FIG. 10, with the mobile communication device forwarding the new voice call a paired computing device, in accordance with another example implementation of the present specification.

Attention is next directed to FIG. 15, which depicts processor 118 of device 102 forwarding, at block 312, new voice call 1004 to computing device 106-1 associated with computing device ID 1300 without terminating current voice call 1002, to enable paired computing device 106-4 associated with computing device ID 1300 to answer new voice call 1004. In FIG. 15, processor 118 establishes a communication session 1500 between device 102 and paired computing device 106-4 associated with computing device ID 1300 on link 116-4 using the SIP protocol (referred to hereinafter as a second SIP session 1500).

The method and system described herein enable a mobile communication device in conjunction with a paired computer device to simultaneously host two voice calls without significant additional cost to improve a user's experience and communication efficiency.

Those skilled in the art will appreciate that in some implementations, the functionality of device 102 can be implemented using pre-programmed hardware or firmware elements (e.g., application specific integrated circuits (ASICs), electrically erasable programmable read-only memories (EEPROMs), etc.), or other related components. In other implementations, the functionality of device 102 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the specification of this patent document contains material which is subject to copyright protection. The copyright owner has no objection to the facsimile reproduction by any one of the patent document or patent specification, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A mobile communication device comprising:

a memory storing one or more computing device identifiers, each computing device identifier associated with a paired computing device;

a communication interface configured to communicate with a communication network;

a display device; and, a processor operably coupled to the communication interface and the display device, the processor configured to:

receive, from the communication network via the communication interface, a new voice call while a current voice call is active on the mobile communication device;

display, on the display, a selectable icon for forwarding the new voice call;

in response to detecting selection of the selectable icon:

display, on the display device, the one or more selectable device identifiers stored in the memory; and, in response to detecting selection of a selectable device identifier of the one or more selectable device identifiers, forward the new voice call, using the communication interface, to the paired computing device associated with the device identifier.

2. The mobile communication device of claim 1, wherein the mobile communication device is associated with a platform identifier, and wherein each paired computing device stored in the memory is currently in communication with the mobile communication device and associated with the platform identifier associated with the mobile communication device.

3. The mobile communication device of claim 1, wherein the processor is further configured to forward the new voice call to the paired computing device without terminating the current voice call by:

establishing a communication session with the paired computing device associated with the device identifier; and, transferring the new voice call to the paired computing device associated with the device identifier using the communication session.

4. The mobile communication device of claim 3, wherein the new voice call is cellular voice call received from a base station of the communication network and the current voice call is a data voice call received from the communication network.

5. The mobile communication device of claim 4, wherein prior to transferring the new voice call, transforming the new voice call to a data voice call, and wherein transferring the new voice call comprises transferring the data voice call to the paired computing device associated with the device identifier using the communication session.

6. The mobile communication device of claim 4, wherein establishing a communication session with the paired computing device associated with the device identifier comprises establishing a session initiation protocol (SIP) session.

7. The mobile communication device of claim 6, wherein transferring comprises transferring access permissions for a speaker and a microphone of the computing device.

8. The mobile communication device of claim 4, wherein the communication interface comprises a cellular circuit configured to communicate with the base station of the communication network, wherein the processor is further configured to:

in response to receipt of an answer call command from the paired computing device, answer the new voice call using the cellular circuit.

9. The mobile communication device of claim 1, wherein the new voice call is data voice call and the current voice call is a cellular voice call received from a base station of the communication network.

10. The mobile communication device of claim 1, wherein the processor is further configured to:

absent detecting selection of the selectable icon for forwarding the new voice call, reject, at the mobile communication device, the new voice call.

11. The mobile communication device of claim 1, wherein the processor is further configured to:

display on the on the display device, a second selectable icon for ignoring the new voice call and;

in response to detecting selection of the second selectable icon, reject, at the mobile communication device, the new voice call.

12. A method comprising:

at a mobile device comprising a processor, a memory, a communication interface, and a display device, receiving, via the communication interface, a new voice call while a current voice call is active at the mobile communication device;

displaying on the display device, a selectable icon for forwarding the new voice call;

in response to detecting selection of the selectable icon:

retrieving, from the memory, one or more stored device identifiers, each stored device identifier associated with a paired computing device;

displaying, on the display device, the one or more stored device identifiers; and, in response to detecting selection of a device identifier of the one or more stored device identifiers, forwarding the new voice call, using the communication interface, to the paired computing device associated with the device identifier.

13. The method of claim 12, wherein the mobile communication device is associated with a platform identifier, and wherein each paired computing device stored in the memory is currently in communication with the mobile communication device and associated with the platform identifier associated with the mobile communication device.

14. The method of claim 12, wherein forwarding the new voice call to the paired computing device without terminating the current voice call comprises:

establishing a communication session with the paired computing device associated with the device identifier; and, transferring the new voice call to the paired computing device associated with the device identifier using the communication session.

15. The method of claim 14, wherein the new voice call is cellular voice call received from a base station of the communication network and the current voice call is a data voice call received from the communication network.

16. The method of claim 15, wherein prior to transferring the new voice call, transforming the new voice call to a data voice call, and wherein transferring the new voice call comprises transferring the data voice call to the paired computing device associated with the device identifier using the communication session.

17. The method of claim 15, wherein establishing a communication session with the paired computing device associated with the device identifier comprises establishing a session initiation protocol (SIP) session.

18. The method of claim 17, wherein transferring comprises transferring access permissions for a speaker and a microphone of the computing device.

19. The method of claim 15, wherein the communication interface comprises a cellular circuit configured to communicate with the base station of the communication network, wherein the processor is further configured to:

in response to receipt of an answer call command from the paired computing device, answer the new voice call using the cellular circuit.

20. The method of claim 12, wherein the new voice call is data voice call and the current voice call is a cellular voice call received from a base station of the communication network.

21. The method of claim 12, wherein the processor is further configured to:

absent detecting selection of the selectable icon for forwarding the new voice call, reject, at the mobile communication device, the new voice call.

22. The method of claim 12, wherein the processor is further configured to:

display on the on the display device, a second selectable icon for ignoring the new voice call and;

in response to detecting selection of the second selectable icon, reject, at the mobile communication device, the new voice call.

23. A non-transitory computer-readable medium storing computer-readable instructions, which when executed by a processor of a mobile communication device comprising display device, a memory and a communication interface causes the processor to:

receive a new voice call while a current voice call is active at the mobile communication device;

display, on the display device, a selectable icon for forwarding the new voice call;

in response to detecting selection of the selectable icon:

retrieve, from the memory one or more stored device identifiers, each stored device identifier associated with a paired computing device; and, display, on the display device, the one or more stored device identifiers;

in response to detecting selection of a device identifier of the one or more stored device identifiers, forward the new voice call, using the communication interface, to the paired computing device associated with the device identifier.

* * * * *